(No Model.) 5 Sheets—Sheet 1.

H. D. HINCKLEY.
VENDING MACHINE.

No. 455,508. Patented July 7, 1891.

Witnesses:
H. Mallner
Henry L. Rickard.

Inventor:
H. D. Hinckley.
By his Attorney,
F. H. Richards.

(No Model.) 5 Sheets—Sheet 2.

H. D. HINCKLEY.
VENDING MACHINE.

No. 455,508. Patented July 7, 1891.

Witnesses:
H. Mallner
Henry L. Reckard

Inventor:
H. D. Hinckley.
By his Attorney,
F. H. Richards

THE NORRIS PETERS CO., PHOTO-LITHO., WASHINGTON, D. C.

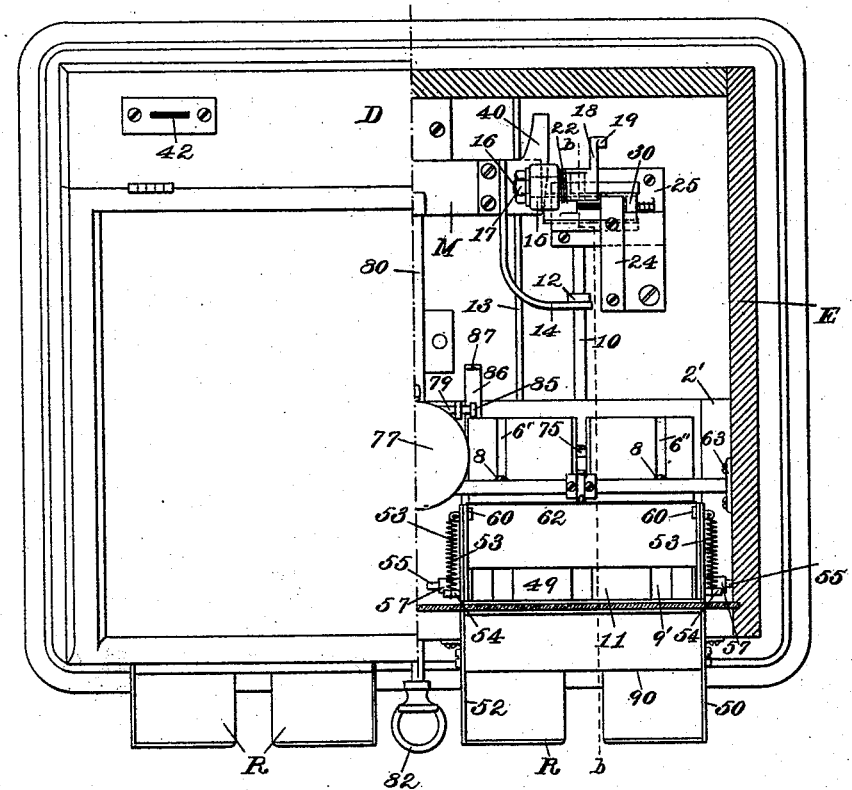

(No Model.)  5 Sheets—Sheet 4.

H. D. HINCKLEY.
VENDING MACHINE.

No. 455,508. Patented July 7, 1891.

Witnesses:
H. Mallner
Henry L. Reckard.

Inventor:
H. D. Hinckley.
By his Attorney,
F. H. Richards (No Model.) 5 Sheets—Sheet 5.

H. D. HINCKLEY.
VENDING MACHINE.

No. 455,508. Patented July 7, 1891.

Witnesses:
H. Mallner
Henry L. Reckard

Inventor:
H. D. Hinckley.
By his Attorney,
F. H. Richards

UNITED STATES PATENT OFFICE.

HENRY D. HINCKLEY, OF HARTFORD, CONNECTICUT, ASSIGNOR OF ONE-HALF TO JOHN G. RICH, OF AUBURN, NEW YORK.

VENDING-MACHINE.

SPECIFICATION forming part of Letters Patent No. 455,508, dated July 7, 1891.

Application filed April 2, 1891. Serial No. 387,371. (No model.)

*To all whom it may concern:*

Be it known that I, HENRY D. HINCKLEY, a citizen of the United States, residing at Hartford, in the county of Hartford and State of Connecticut, have invented certain new and useful Improvements in Vending-Machines, of which the following is a specification.

This invention relates to automatic vending-machines in which articles of merchandise are exchanged for coins.

The object and nature of the invention are set forth in the following description.

Figure 1:
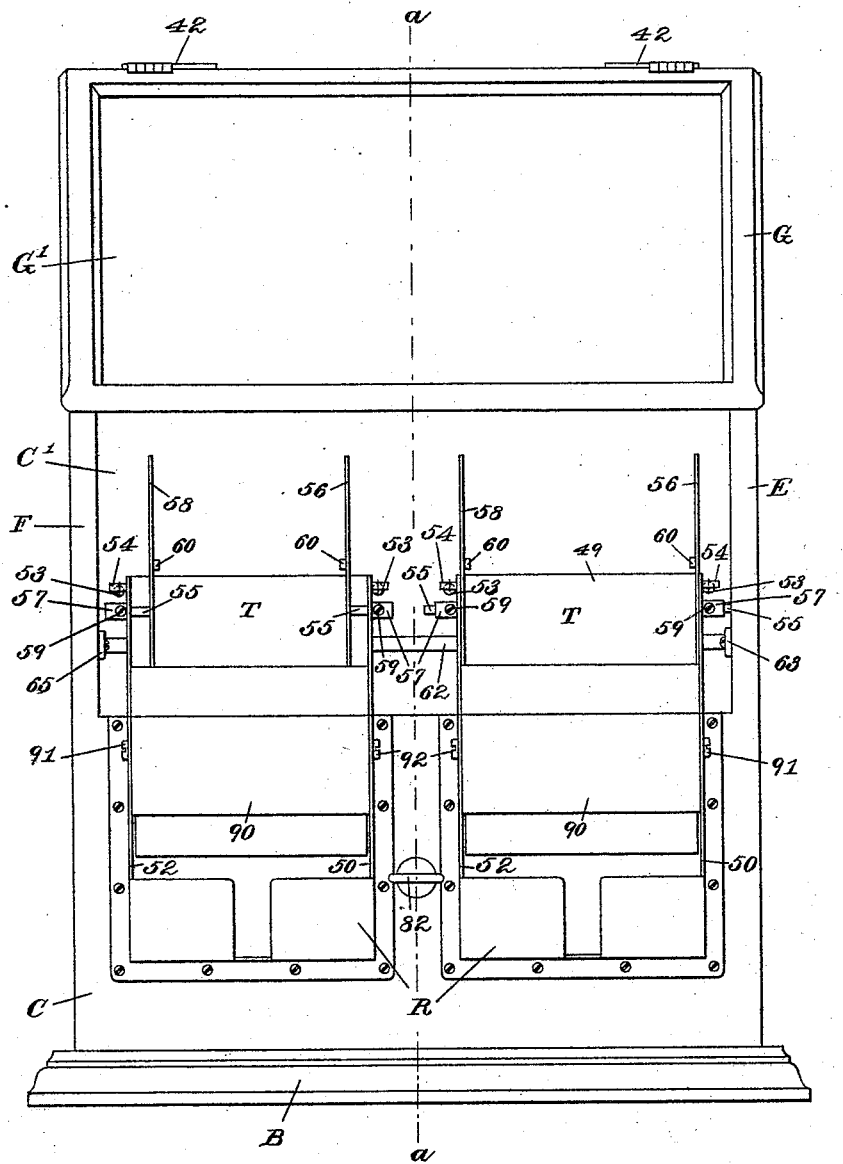
Figure 2:
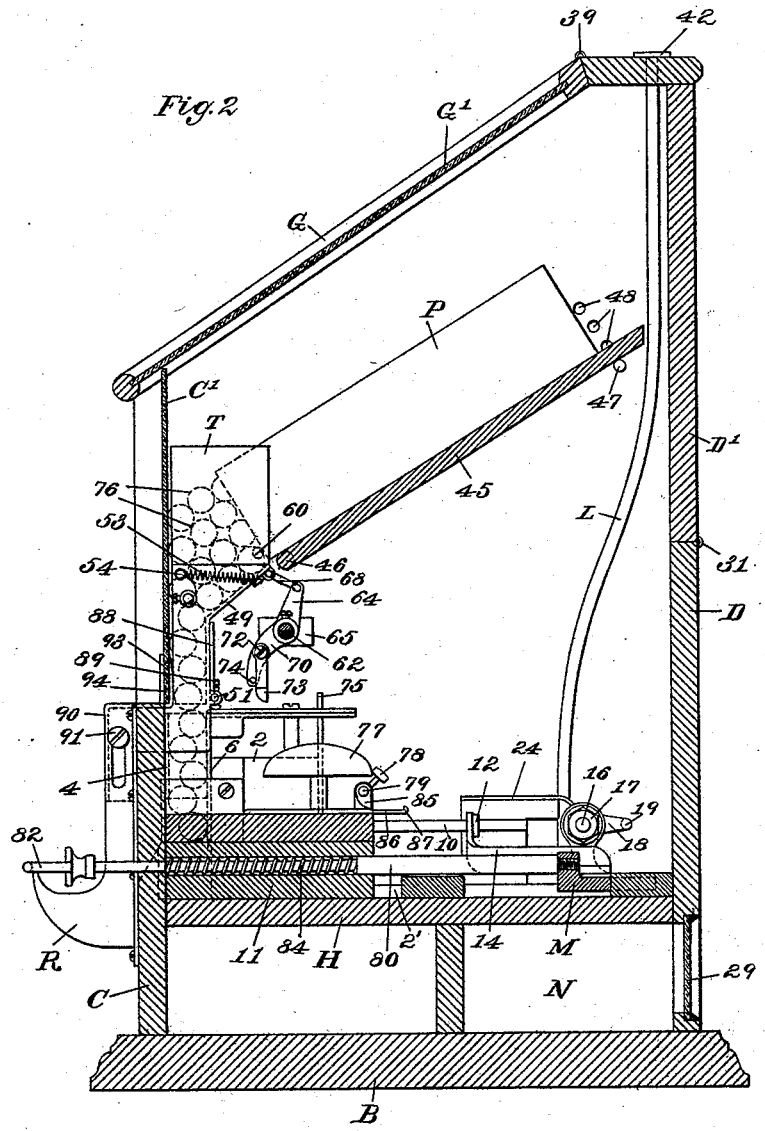
Figure 7:
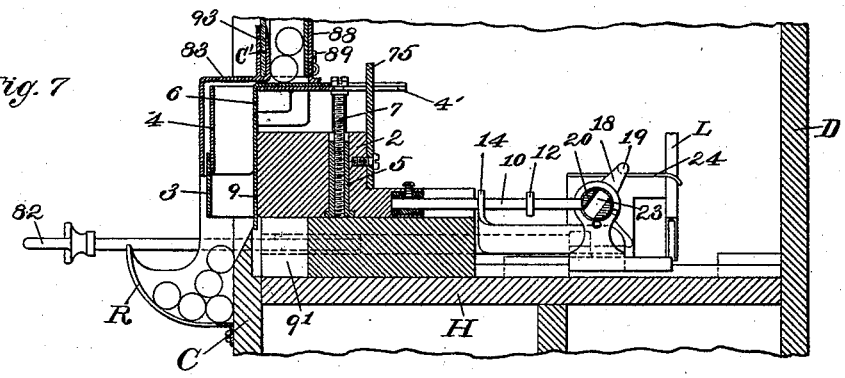
Figure 8:
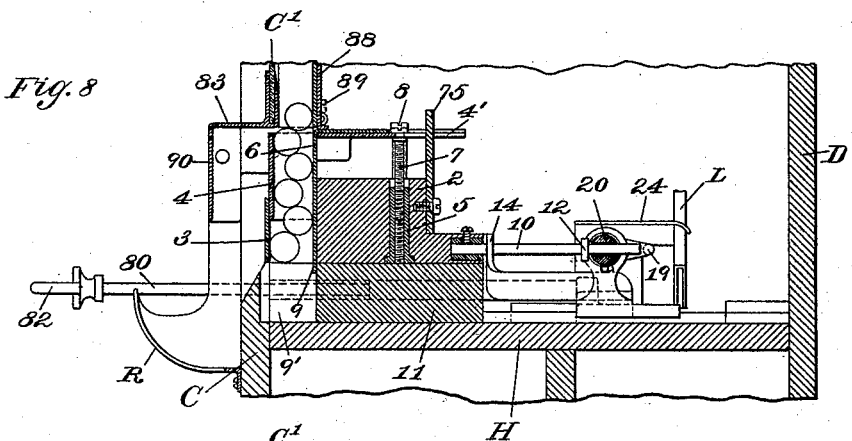
Figure 9:
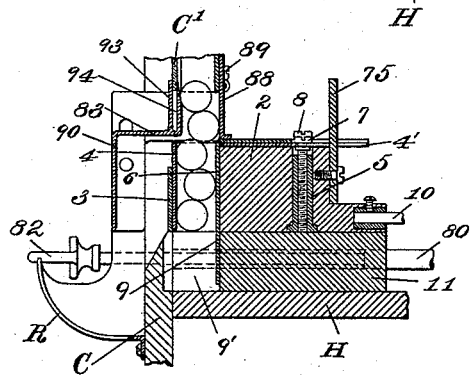
Figure 10:
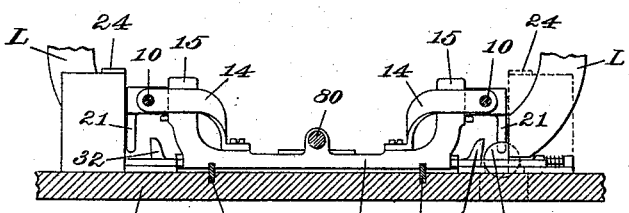
Figure 11:
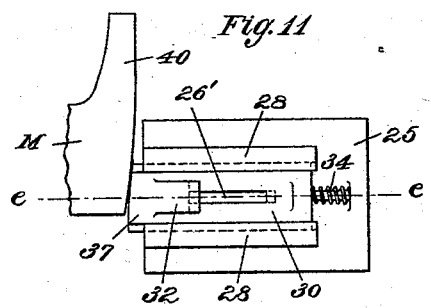
Figure 12:
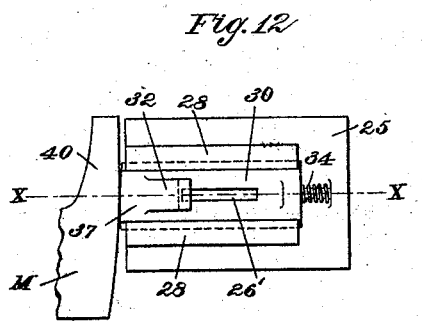
Figure 13:
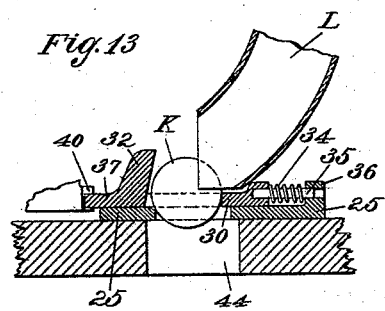
Figure 14:
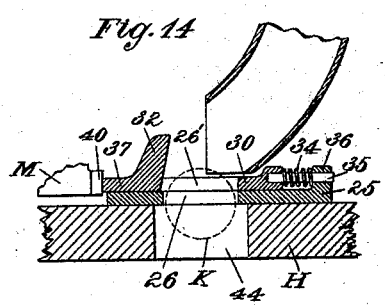
Figure 15:
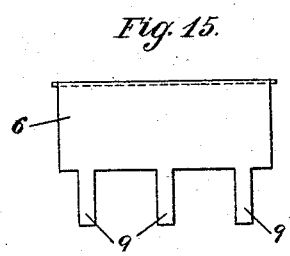
Figure 16:
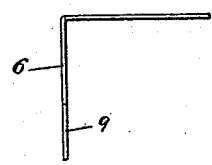
Figure 17:
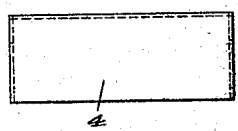
Figure 18:
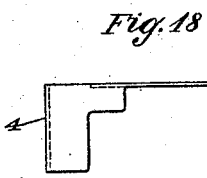
Figure 19:
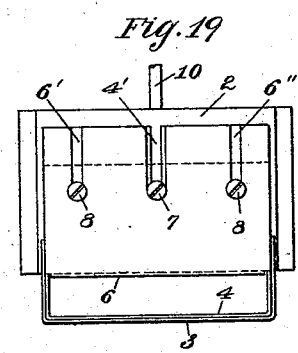

In the drawings accompanying and forming a part of this specification, Figure 1 is a front elevation of a duplex vending-machine embodying my present improvement. Fig. 2 is a transverse vertical section of the machine in line *a a* of Fig. 1 and looking toward the left hand in said figure. Fig. 3 is a plan view of the machine, drawn partly in section, the more clearly to show the construction and arrangemet of the interior parts. Figs. 4, 5, and 6 are enlarged sectional views illustrative of the operation of the lock mechanism. Figs. 7, 8, and 9 are cross-sectional views at or near the line *b b*, Fig. 3, of the goods-delivering apparatus, illustrating the general operation and construction of the mechanism. Fig. 10 is a front elevation of the lock-carrying slide, together with certain minor details. Figs. 11 and 12 are plan views illustrative of the construction and operation of the coin receivers or gages. Figs. 13 and 14 are sectional views of the same in lines *e e* and *x x* of Figs. 11 and 12, respectively. Fig. 15 is a front view, and Fig. 16 a side elevation, of the adjustable back plate of the goods-carrier. Fig. 17 is a front view, and Fig. 18 an end view, of the adjustable front plate of the goods-carrier. Fig. 19 is a plan view of one of the goods-carriers removed from the machine.

Similar characters designate like parts in all the figures.

The casing or cabinet, which contains the working parts of my improved machine, as herein shown, consists of the base B, the front wall C, the rear wall D, the side walls E and F, and the cover G. In the front wall and cover I usually insert glass panels C' and G', respectively, through which to observe the goods and mechanism within the case. In Fig. 1 the two glass panels are supposed to be in place, but to be invisible by reason of their transparency. In Fig. 3 a part of the upper panel G' is supposed to be shown; but in this instance nothing is shown in the drawings underneath said cover-panel. In Figs. 2, 7, 8, and 9 the front panel is shown in section and is to be fixed by suitable means in the position shown in Fig. 2.

At some distance above the base B the case or cabinet has a horizontal wall or floor H, on which the goods-delivering mechanisms are assembled and beneath which is the coin-receiving space N. Access to this space is usually had through a door (not shown) in the end wall E of the casing, while the interior may be viewed through the window 29, which is set in the back wall D. The upper portion D' of the back wall D, Fig. 2, is preferably constructed to form a door, being connected to the lower part D by hinges at 31 and provided at its upper edge with a suitable lock (not shown) for securing the case against access to unauthorized persons. Similarly the top door G is hinged at 39, and is to be provided with suitable means (not shown) for locking the same closed. These two doors furnish ample facility for reaching the interior mechanism.

The reciprocatable slides or goods-carriers are of composite construction, and, being duplicates, a detailed description of one of them will be a sufficient description of both. Each goods-carrier consists of a block 2, the protector or fixed front plate 3, rigidly attached to the said block, the adjustable front plate 4, and the adjustable back plate 6, composing the goods-receiving box or hopper of the carrier. The block 2 is bored to receive the fixed thimble 5, which is threaded to receive the screw 7 for regulating the capacity of the goods-carrier by vertically adjusting the aforesaid plate 6. The front plate 4, which is shown in detail in Figs. 17 and 18, may be a casting, or, if preferred, may be formed of sheet metal cut and bent to the required size and shape. Said front plate rests on top of the block 2, and is slotted at 4', Figs. 7, 8, 9, and 19, to receive the groove-headed elevating-screw 7 for raising and lowering said plate. The back plate 6 (one of which is shown in detail in Figs. 15 and 16) rests on top of the rearward portion (at the right-hand in Figs. 2, 7, 8, and 9) of the front plate 4, and is slotted, as shown at 6' 6'', to receive the binding-screws 8 8, which pass through the said slots in the back plate and firmly screw into the front plate, so as to allow of a forward and backward adjustment of the back plate relatively to the front plate. By means of this construction both the width and depth of the goods-receiving hoppers are made adjustable, thus allowing of considerable variation of the capacity of the said hoppers, both as to the number of cigars and the sizes of them. The back plate 6, being fixed to the front plate 4, is vertically-adjustable therewith by means of the elevating-screw 7. As will be understood from Figs. 15 and 16, the back plate 6 has formed thereon a series of fingers, as 9, which fingers extend below the upper surface of the slide-base 11 into a corresponding number of mortises, as 9', formed therein. Said slide-base 11 rests on the floor H of the casing and forms a bed or support for the two goods-carriers, whose slides 2 2 are guided thereon by suitable gibs, as 2', substantially as shown, in a well-known manner.

The blocks 2 of the goods-carriers each have fixed therein an actuating-rod 10, which rods extend rearwardly and engage with the lock mechanism in a manner hereinafter more fully set forth. A flange or stop-collar 12 is formed on each of said rods, whereby to return the slides after these have been drawn forward. This is accomplished by means of the arms 14, which are bored at their outer ends to receive the rods. Said arms 14, being formed on or fixed to the lock-carrying slide M by screws, as shown in the drawings, engage the collars 12 to return the slides 2 on the return-stroke of said lock-carrying slide.

The lock-carrying slide (designated in a general way by M, and preferably a casting of the form shown) is fitted to slide on the guides 13, which are partially embedded in the floor H, as shown best in Fig. 10. The slide M, as shown in the drawings, is of course designed for a machine having two goods-carriers, and which is otherwise constructed and furnished for vending two sizes, varieties, or qualities of goods. Accordingly the slide M is arranged for carrying two "locks," one for each goods-carrier; but as these locks are alike in form and construction, except that one is made right hand and the other left hand, a description of one of them is deemed sufficient for both.

Referring to Figs. 3 to 10, inclusive, it will be seen that the slide M, which is actuated by hand through the rod 80 and the handle 82 has at the opposite ends thereof suitable arms, as 15, for carrying the aforesaid revolubly-mounted lock. The arm 15 is bored to receive the reduced end 16 of the revoluble lock 20, which is fitted to turn freely in the said arm 15, and is held in place therein by means of a nut, as 17. Said lock or stud 20 has formed thereon an arm or lever 18, having at its outer end a pin 19 for engaging at the proper time the fixed cam-plate 24. The stud 20 has also another arm 21, which may be a pin fixed in the solid outer end of said stud, which arm is designed to engage the coin, and thereby rotate the stud 20 on the forward movement of the slide M, as hereinafter more fully described.

A suitable spring, as the coiled spring 22 on the stud 20, is provided for retracting the lock-stud and its lever-arms, one end of said spring being fixed in the arm 15 and the opposite end in the stud. Said spring is for the purpose of holding the stud 20 normally in the position shown in Figs. 4 and 6, with the axis of the bore 23 thereof normally in alignment with the aforesaid rod 10, as in Figs. 4 and 6.

The coin-gage or coin-receiver is located immediately below the lock when this is in its rearward position. The plate or bed-piece 25 of said receiver has therein an opening 26 for the coin, and is provided with ribs 28 to serve as guides for the gage-slide 30. This slide (also designated as the "coin-releaser") has formed therein a coin-slot 26', (similar to the slot 26 of the bed-piece 25,) and also has formed thereon a projection or coin-stop 32, whose purpose is to limit the movement of the coin, as hereinafter more fully set forth.

A spring 34 is provided, carried on a pin 35, which is fixed in the slide 30, said spring reacting against the abutment 36 of the bed-piece 25 for holding the said slide normally in the working position shown in Figs. 11 and 13. Said pin should be fitted to slide freely through a hole in the abutment 36, as indicated in the drawings, Figs. 13 and 14. The cam-shaped inner end 37 of the slide 30 engages the cam 40 of the lock-carrying slide M. Said cam 40, which is also designated as the "release-actuator," is provided for the purpose of throwing forward the slide 30 to bring the aforesaid slots 26 and 26' into alignment, as shown in Figs. 12 and 14, on the forward movement of the said slide M.

The coin K is to be put by the customer into the slot at 42 at the top of the casing, when the coin slides down through the coin-chute L, strikes the stop 32, and lodges in the position shown in Fig. 13, resting on the plate 25 at the left hand thereof and partially in the slot 26. If the slide M be now drawn forward, the cam 40 on said slide operates to push back the slide 30 against the power of the spring 34, thus bringing the slots 26 and 26' into alignment, as illustrated in Figs. 12 and 14, thereby allowing the coin to freely pass through the said slots (and through the opening 44 in the floor H of the casing) and fall into the coin-box N. On retracting the slide M, the spring 34 resets the gage-slide 30 in its position, (shown in Figs. 11 and 13,) ready for receiving and supporting another coin.

The machine shown in the drawings being arranged for vending cigars means are required for supporting the cigar-box. For this purpose a shelf 45 is pivotally supported at its forward and lower end at 46 in the side walls E and F of the casing, and is supported at its rearward end on pins, as 47, which fit into one of a series of holes 48, that are formed in the said end walls. A number of said holes 48 are provided, so that the inclination of the shelf 45 may be regulated by shifting the pins 47 from a lower to a higher position, or vice versa.

In preparing my machine for operation the cover of the box P, containing the cigars to be vended, should be removed and also one end thereof, when the box is placed on said shelf 45, as shown in Fig. 2, with its forward end projecting into the goods-delivering hopper. The cigars fall or slide from the box P into said hopper, and from thence pass down into the hereinbefore-described goods-carrier, and are finally delivered to the receptacle R, from which they may be taken by the purchaser. The sides 50 and 52 of the aforesaid receptacle R extend upwardly and rearwardly within the cabinet to form the sides of said delivery-hopper. The back of this hopper is formed of a separate piece 49, pivoted at 51 to the said side pieces 50 and 52. The back of the hopper is kept normally closed, or in the position shown in Fig. 2, by means of springs, as 53, one end of which springs are attached to the said back piece 49 and the opposite ends to suitable pins, as 54, fixed in the side pieces 50 and 52. (See Figs. 2 and 3.)

As will be best understood from Fig. 1, I have provided supplemental side pieces for the hopper, said pieces being adjustable to provide for cigars of different lengths. Said supplemental side pieces 56 and 58 are supported by suitable pins, as 55, which are fixed in said pieces, and are fitted to freely slide in the hubs or bosses 57, that are formed on said hopper sides. Ordinary set-screws, as 59, are provided to secure said supplemental side pieces in any desired position. In Fig. 1 these side pieces or side guides are shown set farthest apart in the right-hand apparatus and set nearer together in the left-hand apparatus. Stops or pins, as 60, Figs. 1 and 2, are provided on the inner sides of the pieces 56 and 58, against which the forward end of the box P may rest, thus preventing said box from being placed too far forward on the shelf 45.

When the box of cigars has been prepared, as described, and properly placed on the shelf 45, the cigars will roll or slide from the box and fill the delivery-hopper T, as shown by the several dotted circles 76 in Fig. 2.

In practice there is a possibility of the cigars clogging in the hopper T, and to obviate this accident the back of said hopper is pivotally arranged, as above described, and is furnished with an apparatus for swinging back the said back-piece 49 on its pivots each time that the goods-carrier is drawn fully forward, the back 49 being snapped back to place suddenly by means of the springs 53, thus shaking the cigars and making them settle down into place. Said vibratory or shaking apparatus may properly be constructed and arranged as follows: A rock-shaft 62 is fitted to turn freely in suitable bearings, as 63 and 65, which are fixed by means of screws or otherwise to the side walls E and F of the casing. The arm 64 is fixed on said shaft, and is connected at its upper end by means of a link 68 to the movable back piece 49 of the hopper T. A similar arm 70, similarly fixed on the rock-shaft 62, has freely pivoted thereon at 72 a pawl 73. A stop-pin 74 is fixed in the lower end of the arm 70 to engage the pawl 73. An arm 75, preferably a stiff piece of metal, is fixed onto the rearward end of the block 2, (see Figs. 7, 8, and 9,) and on the forward movement of the goods-carrier engages said pawl 73, and through said pawl the pin 74, and the arms and link above described swings back the back-piece 49 on its pivots 51, in practice generally from one-tenth to one-fourth of an inch. When the arm 75 has moved forward far enough to allow it to pass underneath the pawl 73, then the springs 53 instantly throw the back piece 49 back to place, as set forth. The lock-carrying slide M is or may be actuated by means of a pull-rod 80, which is firmly attached thereto, and is furnished with a suitable handle, as 82. Said rod passes through the slide-base 11 and carries a spring 84 for retracting the slide M when the operator releases the handle.

In Figs. 2 and 3 I have shown a signal-bell 77 carried by the base 11. A bell-hammer 78 is carried on the rock-shaft 79, which shaft is journaled in bearings supported on said base. A suitable spring (not shown) may be provided for holding the hammer normally against the bell in a well-known manner. To the outer end of the shaft 79 is fixed an arm or lever 85. A projecting arm 86, fixed to the goods-carrier, has a hook 87, which engages the lever 85 on the forward movement of the goods-carrying slide, thus drawing back the hammer 78. When the goods-carrier passes forward to the end of its stroke, the hook 87 passes beyond and releases the lever 85, when the hammer strikes the bell 77, thereby calling attention to the fact that the machine has been operated. This enables any attendant of the store or place where the machine is used to observe the customer, and thus guard against fraudulent attempts to misuse the apparatus.

In Figs. 2, 7, and 8 the goods-carrier is shown set for receiving five cigars at a time, the plates 4 and 6 being properly raised therefor.

In Fig. 9 the goods-carrier is shown adjusted for receiving only three cigars. In this case and unless provided against there would be an opening between the lower edge of the back plate 49 and the said goods-carrier. To cover this opening and to prevent the cigars falling out of the hopper, I have provided an adjustable cover, as 88, preferably made of sheet metal and provided with a clamp-screw 89, by means of which said cover may be adjusted on the back of the hopper to come close down to the plate 4, whatever its height. For a similar reason the front plate 90 of the goods-receptacle is made vertically adjustable by means of the screws 91 and 92, (see Figs. 1, 2, and 7 to 9, inclusive,) the upper end 93 of said plate 90 being formed with a slot 94, Fig. 9, to inclose the lower edge of the glass panel C'. The adjustment of said plate 90 is illustrated in Figs. 8 and 9, showing its upper and lower positions, respectively, always with the horizontal part 83 just above the upper side of the plate 4.

The general operation of the machine is as follows: The hopper T being suitably supplied with goods and the goods-carrier and the accessory plates 90 and 88 being properly adjusted, the customer drops the required coin into the coin-chute L, which delivers the coin to the coin supporter or receiver, as shown at K in Fig. 13. Next the handle 82 is seized and the slide M drawn forward from its position in Figs. 2 and 3 to its position shown in Figs. 7 and 8. On the first forward movement of said slide M the arm 21 of the lock 20 strikes the coin K, as illustrated in Fig. 4, and as the slide advances said arm 21 of said lock is shifted from its position in Fig. 4 to its position in Fig. 5, at the same time bringing the crank-arm pin 19 above the guide-arm 24, as shown in Fig. 5, and bringing the bore 23 of said lock out of alignment with the push-rod 10, so that on the continued forward movement of the slide M the lock bears against said rod and pushes forward the goods-carrier from its position in Fig. 2 to its position in Fig. 7, thereby carrying the goods in said carrier forward of the base 2 and permitting them to discharge into the receptacle R. During said forward movement and after the lock has reached the position shown in Fig. 5 the cam 40 acts upon the coin-releaser 30 to throw this from the position shown in Fig. 13 to the position shown in Fig. 14, thereby releasing the coin, which falls, as hereinbefore described, into the box N. The goods having been received by the customer, he releases the handle 82, when the spring 84 throws back the slide M to its original position, (shown in Figs. 2 and 3,) thereby, as hereinbefore described, resetting the coin gage or releaser 30 and also permitting the lock 20 to resume its original position, (shown in Fig. 4.) When the slide M is drawn forward, there being no coin at K, Figs. 4, 5, and 13, the lock 20 is not turned, as described, but remains in its original position, and in going forward passes freely over the rod 10, leaving the goods-carrier in its original position. This mode of operation of the apparatus is illustrated in Figs. 6 and 8, wherein said slide M is drawn forward, the goods-carrier and its rod 10 remaining retracted.

In practice, as hereinbefore mentioned, each of the two goods-carriers is generally supplied with the different qualities or kinds of goods. Should the customer desire to receive some of each kind simultaneously, he has only to drop the proper coins into the respective coin-chutes, when by drawing forward the handle 82 each of the goods-carriers will be operated.

It will be understood that one advantage of the adjustable goods-carrier is that different quantities of the same goods (or of different goods) may be sold from the same cabinet.

Having thus described my invention, I claim—

1. In a vending-machine, the combination, with a reciprocatable goods-carrier, of a hand-actuated slide, a goods-carrier-actuating lock revolubly mounted on said slide and having a projecting arm, and a coin-supporter located in the path of said arm and forward thereof when said hand-actuated slide is in its rearward position, whereby on the forward movement or the slide the lock is shifted by a coin present in said supporter into position for engaging the goods-carrier to actuate the same, substantially as described.

2. In a vending-machine, the combination, with the reciprocatable goods-carrier having the projecting push-rod, of a hand-actuated slide, a perforated lock, substantially as described, revolubly mounted on said slide in alignment with said push-rod and having a projecting arm, and the coin-supporter located in the path of said arm and forward thereof when said slide is in its rearward position, whereby on the forward movement of the slide the lock is shifted by the coin present in said supporter to throw said perforation out of alignment with said rod and bring the lock into engagement with the rod to actuate the goods-carrier, substantially as described.

3. In a vending-machine, the combination, with the goods-carrier and its push-rod and with a coin-supporter, of the hand-actuated slide, the carrier-actuating lock revolubly mounted on said slide and having an arm set for engaging the coin, and a coin set to engage the lock after this is set into its operative position by the coin, substantially as described.

4. In a vending-machine, the combination, with the goods-carrier and its push-rod and with a coin-supporter having a coin-releaser, of the hand-actuated slide, the carrier-actuating lock revolubly mounted on said slide and having an arm set for engaging the coin, means engaging and holding the lock after this is set into its operative position and during the forward movement thereof, and a releaser-actuator on the hand-actuated slide, whereby the coin is released after the operation of the lock, substantially as described.

5. In a vending-machine, the combination, with the hand-actuated slide carrying the lock revolubly mounted thereon and having the coin-engaging arm and the lever-arm 18, of a coin-supporter located in the path of said coin-engaging arm and a fixed cam set to engage the lever 18 when the lock has been actuated by a coin and to pass clear of said lever in the absence of a coin, substantially as described.

6. In a vending-machine, the combination, with the hand-actuated slide and a lock, substantially as described, mounted on said slide, of the coin-supporter having the releaser and a cam actuating said releaser from and during the forward movement of the hand-actuated slide, substantially as described.

7. In a vending-machine, the combination, with the slotted base 25, of the releaser-slide on said base and correspondingly slotted for the coin, the coin-chute set to deliver the coin to said slots, and a spring normally holding the releaser in position to support the coin, substantially as described.

8. In a vending-machine, the combination, with the hand-actuated slide, of the coin-supporter consisting of the slotted base and the slotted releaser movable on said base, means delivering the coin to said slots, a spring normally holding the releaser in position for supporting the coin, and the cam on the hand-actuated slide operating the releaser to release the coin on the forward movement of said hand-actuated slide, substantially as described.

9. In a vending-machine, the combination, with a goods-carrier and its push-rod and with a coin-supporter, of the hand-actuated slide, the lock 20, revolubly mounted on said slide in alignment with said push-rod, said push-rod being constructed to pass through the lock on the forward movement thereof and having a stop 12, means, substantially as described, constructed to actuate the lock by a coin in the coin-supporter, and means on said hand-actuated slide engaging said stop to retract the goods-carrier, substantially as described.

10. In a vending-machine, the combination, in the goods-carrier and with the slide thereof, of the plates 3 and 4, carried on said slide, and means elevating the plate 4 for regulating the capacity of the carrier, substantially as described.

11. In a vending-machine, the combination, in the goods-carrier and with the slide thereof, of the fixed plate 3, the vertically-adjustable plate 4, means elevating the adjustable plate for regulating the height of the carrier, and the laterally-adjustable plate 6, carried on said vertically-adjustable plate, substantially as described.

12. In a vending-machine, the combination, with the goods-carrier adjustable in height, of the delivery-hopper and the adjustable plate carried on the rear wall of said hopper and adjustable vertically to the carrier, substantially as described.

13. In a vending-machine, the combination, with the goods-carrier adjustable in height, of the delivery-hopper having the front wall C' and the guard-plate set forward of the carrier and vertically adjustable, said guard-plate being constructed to engage the lower edge of said front wall, substantially as described.

14. In a vending-machine, the combination, with the goods-carrier and with the delivery-hopper over said carrier, of the pivotally-supported rearward hopper-wall, means, substantially as described, normally holding said wall in position, and an actuating device, substantially as described, intermediate to the carrier and said wall and having therein a pawl, allowing the carrier to move in one direction without actuating the wall, substantially as described.

15. In a vending-machine, the combination, with the goods-carrier and the vibratory wall, of a spring normally holding said wall in its forward position, a rocker, substantially as described, connected to said vibratory wall and having the pawl, and an arm on the goods-carrier set to engage said pawl and thereby operate the vibratory wall of the hopper on the movement of the goods-carrier, substantially as described.

16. In a vending-machine, the combination, with the delivery-hopper thereof and with the means supporting the box P, of the adjustably-supported side pieces 56 and 58, substantially as described.

HENRY D. HINCKLEY.

Witnesses:
HENRY L. RECKARD,
H. MALLNER.